United States Patent [19]

Russell

[11] 4,260,535
[45] Apr. 7, 1981

[54] ANTIFOULANT COMPOSITION AND METHOD

[75] Inventor: David B. Russell, Westfield, N.J.

[73] Assignee: M&T Chemicals Inc., Woodbridge, N.J.

[21] Appl. No.: 71,929

[22] Filed: Sep. 4, 1979

[51] Int. Cl.$^3$ .............................................. C08K 5/01
[52] U.S. Cl. ........................ 260/33.6 UA; 106/15.05; 260/42.52; 525/201
[58] Field of Search .................... 260/42.52, 33.6 UA; 525/201; 106/15.05

[56] References Cited

U.S. PATENT DOCUMENTS 3,979,354   9/1976   Dyckman et al. .................... 525/201
4,174,339   11/1979  Matsuda et al. .................... 106/15.05

FOREIGN PATENT DOCUMENTS 1062324   3/1967   United Kingdom ................. 106/15.05

Primary Examiner—Lewis T. Jacobs
Attorney, Agent, or Firm—Stanley A. Marcus; Donald G. Marion; Robert Spector

[57] ABSTRACT

The durability of coatings formed from antifouling compositions containing a biologically active organotin-containing polymer as the film-forming component is improved by the presence of at least one biologically inactive organotin-containing polymer in an amount of from 0.01 to 10% based on the weight of the initial coating composition.

10 Claims, No Drawings

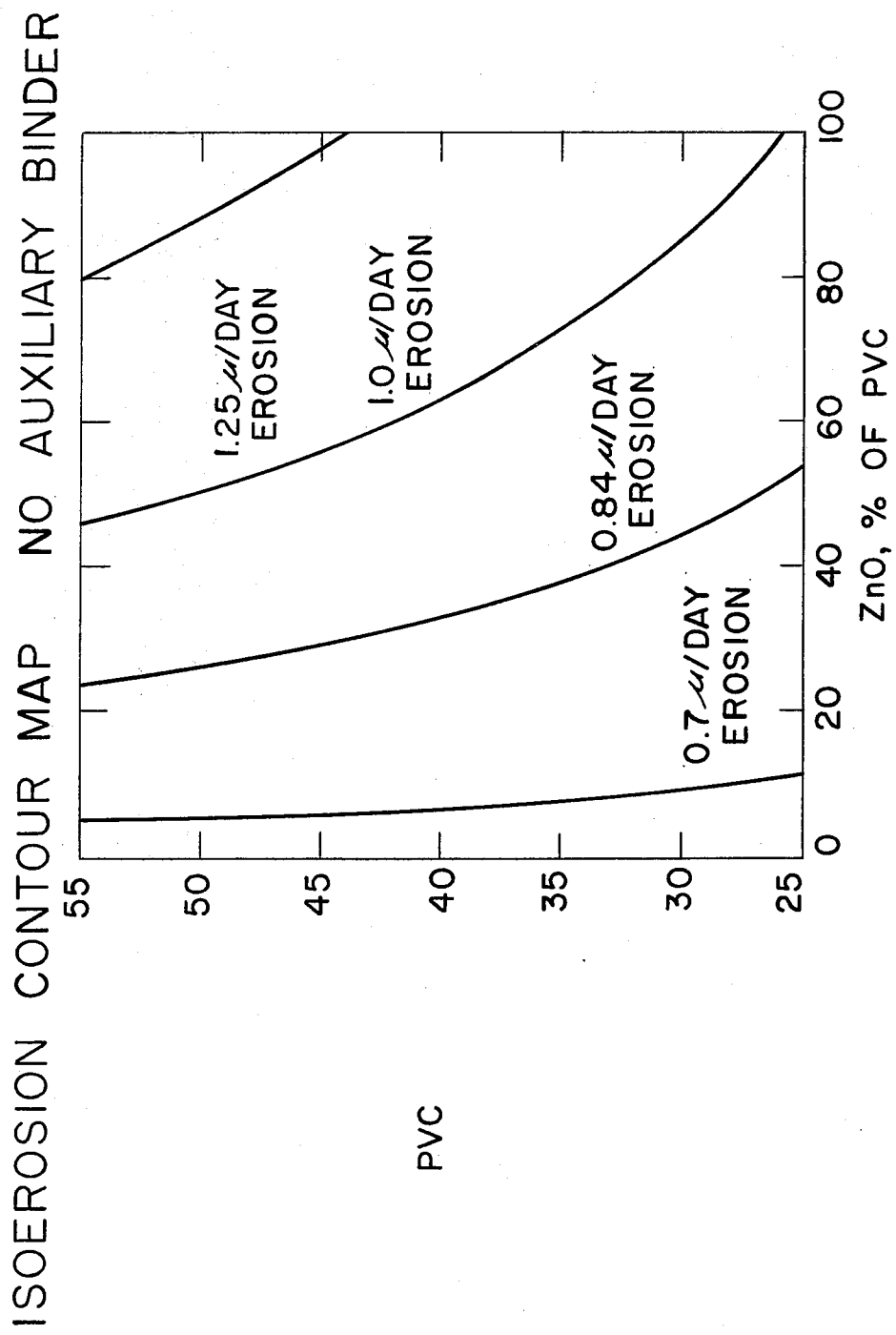

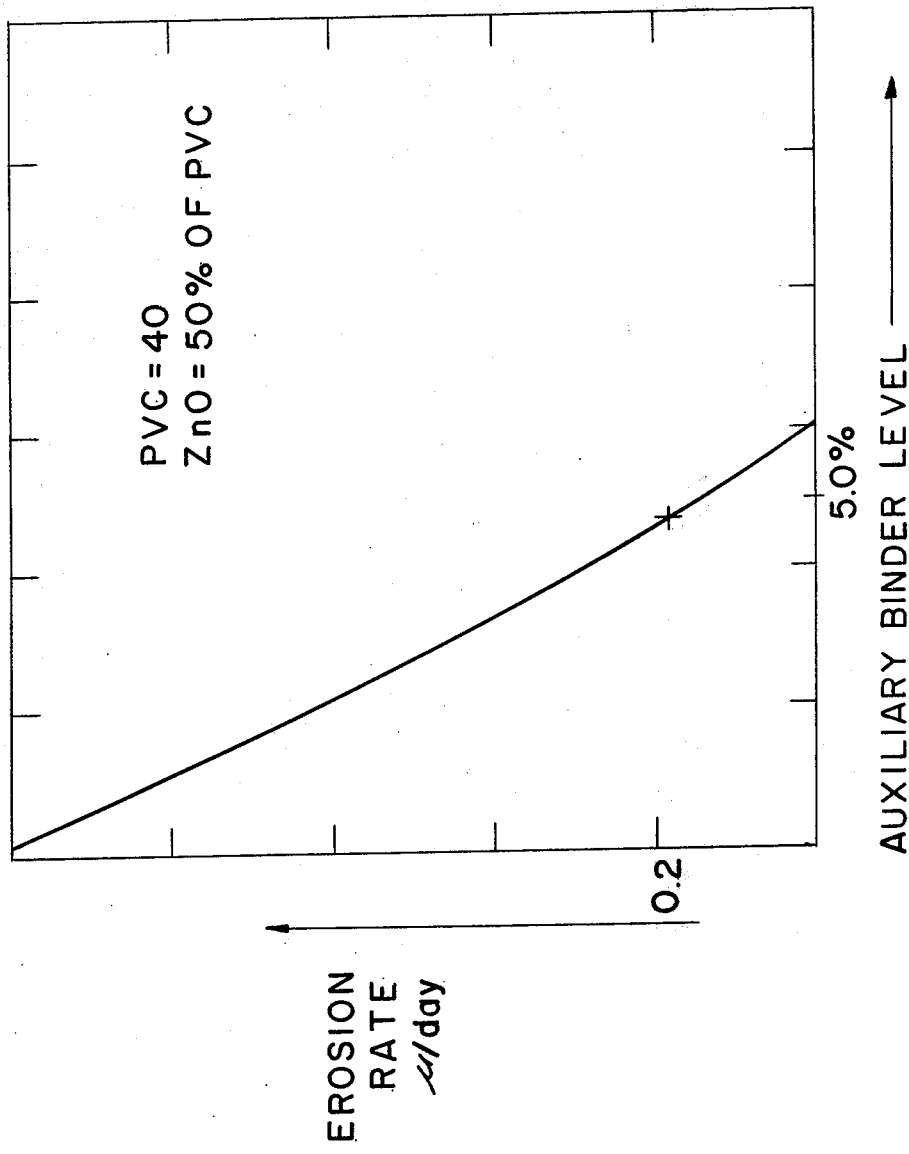

ANTIFOULANT COMPOSITION AND METHOD

This invention relates to novel biologically active polymeric materials. More specifically, it relates to novel marine antifoulant compositions containing mixtures of organotin polymers as the film-forming component, wherein at least one of the said organotin polymers is biologically active.

Organotin polymers, such as those described in U.S. Pat. Nos. 3,167,473, 4,064,338, and 4,121,034 are known to be effective film-forming antifoulant agents which can serve as the binder component of a marine antifoulant paint. Such paints are typically comprised of binder; pigments such as red iron oxide, titanium dioxide, and zinc oxide; thickeners such as bentonite and fumed silica; extenders such as talc; and inert diluents typified by mineral spirits, naphtha, xylene, methyl isobutylketone, etc.

Typical film-forming organotin-containing polymers useful as biologically active binders in marine antifoulant compositions are disclosed in U.S. Pat. Nos. 3,167,473, 4,064,338, and 4,121,034. Coatings resulting from the drying of such compositions exhibit weak structural integrity, particularly under dynamic flow conditions such as exposure to moving sea water, due to the inability of the relatively soft organotin polymer to bind the solid additives into a tightly cohesive matrix. Consequently, the useful life of such coatings when exposed to dynamic flow conditions in relatively short due to weakness of the binder-pigment interaction that results in excessive erosion of the coating.

It is the object of this invention to provide a novel method for improving the dynamic cohesive strength of marine antifoulant coatings based on biologically active, film-forming organotin polymers through the addition of another film-forming organotin polymer which is not necessarily biologically active.

It has now been found that the dynamic cohesive strength of a marine antifoulant coating is improved or modified resulting in a predictable and extended performance lifetime under dynamic conditions by utilizing a film-forming system based on a combination of organotin-containing polymers whereby at least one of said organotin polymers contains less than 15 mole % of triorganotin compound and the other contains more than 25 mole % of the triorganotin compound.

SUMMARY OF THE INVENTION

This invention provides an improved composition for protecting marine surfaces against the growth of fouling organisms, said composition consisting essentially of:
(a) 1 to 30% by weight of the total composition of a biologically active film-forming polymer derived in part from a first triorganotin compound exhibiting the formula $R_3SnOOCR'$
wherein
R is selected from the group consisting of alkyl, cycloalkyl, and aryl radicals, and
R' is a polymerizable group selected from the group consisting of vinyl, α-methylvinyl, and phenylvinyl radicals,
wherein
repeating units derived from said compound constitute from 25–80 mole % of the total repeating units present in said polymer, the remaining 20–75 mole % of said repeating units being derived from at least one ethylenically unsaturated compound that is copolymerizable with said first triorganotin compound,
(b) 1 to 50% by weight of the total composition of at least one metalliferous pigment, and
(c) 30 to 80% by weight of the total composition of an inert diluent,
the improvement which consists of the presence in said composition of from
0.01 to 10% by weight of the total composition of a biologically inactive film-forming polymer derived in part from a second triorganotin compound exhibiting the formula $R_3^2SnOOCR^3$,
wherein
$R^2$ is selected from the same group as R and
$R^3$ is selected from the same group as R' and the repeating units derived from said triorganotin compound constitute from 1 to 15 mole % of the total repeating units present, the remaining 85–99 mole % of said repeating units being derived from at least one ethylenically unsaturated compound that is copolymerizable with said second triorganotin compound.

Through the selection of the ratios of the polymers comprising the film-forming component of the paint system, predictable and extended performance lifetimes relative to prior art compositions under dynamic conditions can be achieved.

The novel feature of the composition of this invention resides in the presence in said composition of a polymer derived from a monomer mixture containing a relatively small amount of biologically active triorganotin compound, the remaining monomers being those which are known to yield tough, durable films when in polymer form. The concentration of triorganotin species in the final polymer is insufficient to yield significant biological activity as specified in U.S. Pat. No. 4,064,338 and 4,121,034.

The auxiliary organotin polymeric binder, when incorporated at useful concentrations, must be compatible with the biologically active organotin polymer and the solvent system utilized in the coating composition. It must provide sufficient cohesiveness to the coating (without adversely affecting the antifoulant properties of the coating), to extend the performance lifetime of said coatings.

The auxiliary organotin polymeric binders are film-formers in their own right, yielding tough, glassy coatings. When used as the auxiliary binder, as the minor component of the binder system, the dynamic cohesive strength of the coating formed from the antifoulant paint is improved, allowing extended performance lifetime without sacrificing antifoulant properties.

The concentration of the organotin polymer auxiliary binder to be incorporated into the biologically active organotin polymer containing antifoulant paint will depend on the upper concentration limit of compatibility and on the effective concentration for optimizing dynamic cohesive strength while maintaining antifouling performance. The effective concentration will vary depending on the pigment type(s) utilized in the coating compositions.

In the foregoing formulae, R and $R^2$ represent those hydrocarbon radicals normally associated with biologically active triorganotin compounds. For example, R and $R^2$ may be an alkyl radical containing from 1 to 8 carbon atoms, a cycloaliphatic radical such as cyclopentyl or cyclohexyl, or a phenyl radical. It is understood that R and $R^2$ may be inertly substituted, e.g. may bear a nonreactive substituent such as alkyl, cycloalkyl, aryl, arakyl, alkaryl, alkenyl, ether, halogen, ester, etc.

The composition of the biologically active organotin polymer consists of at least one of the $R_3SnOOCR'$ compounds and at least one copolymerizable compound selected from the groups which are described in the pertinent sections of U.S. Pat. Nos. 3,167,473, 4,064,338, and 4,121,034 which are hereby incorporated by reference. The concentration of the $R_3SnOOCR'$ compound is from 25 to 80 mole % of the total monomers present in said polymer. The polymer can be prepared by either polymerization of the desired monomer mixture or by reacting a preformed organic polymer containing a reactive carboxylic acid with a suitable triorganotin compound.

The composition of the auxiliary organotin polymeric binder consists of at least one of the $R_3{}^2SnOOCR^3$ compounds and at least one copolymerizable compound selected from the groups which are described in the pertinent sections of U.S. Pat. Nos. 3,167,473, 4,064,338, and 4,121,034. The concentration of the $R_3{}^2SnOOCR^3$ compound is $\leq 15$ mole % of the total monomers present in said polymer. The polymer can be prepared by either polymerization of the desired monomer mixture or by reacting a preformed organic polymer containing a reactive carboxylic acid with a suitable triorganotin compound.

Among the metalliferous pigments that can be included are inert compounds such as iron oxide, zinc oxide, titanium dioxide and talc, and biologically active compounds such as cuprous oxide, copper thiocyanate, tributyltin fluoride, tricyclopentyltin fluoride, tricyclohexyltin hydroxide, triphenyltin fluoride, and triphenyltin hydroxide.

The following examples illustrate the present method and the improved coating compositions obtained thereby.

EXAMPLE 1

Preparation of the auxiliary binder.

A 2-liter capacity polymerization reactor equipped with a $N_2$ inlet, $H_2O$ cooled condenser, thermometer, and stirrer is charged with 37.5 g tributyltin methacrylate, 137.8 g butyl methacrylate, 500 ml "Hi-Flash Naphtha®", and 0.036 g benzoyl peroxide. The contents of the flask are heated at 80° C. for 8 hours to obtain greater than 95% conversion of monomers to polymer.

EXAMPLE 2

The polymer solution prepared in Example 1 was added at 5, 10, and 25% solids volume concentration to a 50% by weight solution of a biologically active organotin polymer prepared as described in Example 1 of U.S. Pat. No. 4,064,338. All solutions were miscible and none exhibited phase separation after 6 months at room temperature (77° F.).

EXAMPLE 3

Dry films prepared from the mixtures of the two polymer solutions as described in Example 2 were clear and transparent and remained so when examined 6 months after preparation. These results demonstrate excellent compatibility between the biologically active organotin polymer and the auxiliary organotin film-forming polymer.

EXAMPLE 4

The antifouling properties of the auxiliary binder prepared as described in Example 1 was compared to that of the biologically active organotin polymer. Fiberglass discs with a 2.5 inch radius were coated with clear films of the two polymers. The test discs together with untreated discs were immersed below tide level in the ocean at Biscayne Bay, Fla.

After 5 weeks of immersion, the untreated discs and the disc coated with the auxiliary binder coating were completely fouled whereas the disc coated with the biologically active organotin polymer was completely free of fouling organisms showing that the organotin polymeric auxiliary binder is not an effective antifoulant agent.

EXAMPLE 5

Fiberglass panels (8 inches by 12 inches) were coated with the polymer mixtures from Example 2 which contain the auxiliary binder at 5 and 10% solids volume concentration. The test panels together with untreated panels were immersed below tide level in the ocean at Biscayne Bay, Fla.

After 12 months of immersion, the coated panels were free of fouling organisms whereas the untreated panels were completely fouled, demonstrating that the auxiliary binder does not adversely affect antifouling performance of the biologically active organotin polymer.

EXAMPLE 6

Antifouling paints suitable for test purposes were prepared according to known commercial practices. Table I shows the coating compositions of test panels treated with antifouling paints containing the biologically active organotin film-forming polymer but without the auxiliary organotin polymeric binder. Constituent concentrations are in volume percent, as 100% solid.

TABLE I

| | A | B | C | D | E | F | G | H | I |
|---|---|---|---|---|---|---|---|---|---|
| Biologically Active Organotin Polymer | | | | | | | | | |
| | 75 | 75 | 75 | 60 | 60 | 60 | 45 | 45 | 45 |
| Iron Oxide | 25 | 12.5 | 0 | 40 | 20 | 0 | 55 | 27.5 | 0 |
| ZnO | 0 | 12.5 | 25 | 0 | 20 | 40 | 0 | 27.5 | 50 |
| | 100 | 100 | 100 | 100 | 100 | 100 | 100 | 100 | 100 |
| Pigment Volume Concentration (PVC) | | | | | | | | | |
| | 25 | 25 | 25 | 40 | 40 | 40 | 55 | 55 | 55 |

Paint E was modified so as to contain varying amounts of the auxiliary organotin polymeric binder as shown in Table II.

TABLE II

| | E-1 | E-2 | E-3 | E-4 |
|---|---|---|---|---|
| Biologically Active Organotin Polymer | 60 | 57 | 54 | 51 |
| Auxiliary Organotin Polymeric Binder (Ex. 1, as 100% solid) | 0 | 3 | 6 | 9 |

The paints were adjusted to a solids content of 25% by weight, by the addition of xylene. Test panels were treated with the test paints to give dry coating thickness of 300μ.

EXAMPLE 7

The resistance to erosion in moving sea water of the test coatings described in Example 6 were tested using apparatus specifically designed to measure the rate of erosion of coatings under dynamic conditions as described by de la Court et al in J. Oil Col. Chem. Assoc., 56, 388 (1973). The results are summarized in FIGS. 1 and 2.

FIG. 1 shows the rate of erosion in moving sea water of coatings A-I described in Example 6 (without auxiliary binder). Increasing pigment volume concentration and zinc oxide cause an increase in erosion rate. The minimum erosion rate obtainable, 0.7 $\mu$/day, demonstrates that a 300$\mu$ coating will completely wear off in 430 days.

FIG. 2 shows the influence on erosion of the auxiliary binder in coatings E-1-E-4, described in Example 6, when added as an auxiliary binder to coating composition E of Example 6. At a concentration of 5% by volume of the binder system, erosion rate in moving sea water is reduced to 0.2 $\mu$/day, giving a 300$\mu$ coating a lifetime of 1500 days, a 300% increase over the coating of Example 2 which erodes at 0.7 $\mu$/day.

EXAMPLE 8

Test panels treated with coating compositions E-1 and E-2, described in Example 6, were immersed below tide level in the ocean at Biscayne Bay, Fla.

After 6 months immersion, both panels were free of fouling organisms. Coating E-1 easily released pigment when finger-rubbed after the immersion period, as evidenced by the red stain from the iron oxide, demonstrating that there is a weak pigment binder interaction in the coating.

Coating E-2 did not release pigment when finger-rubbed after the period of immersion, demonstrating the strengthening effect of the organotin polymeric auxiliary binder.

What is claimed is:

1. In an improved process for protecting marine surfaces against growth of fouling organisms, the said process comprises treating said marine surface with a coating composition containing:
   (a) 1 to 30% by weight of the total composition of a biologically active film-forming polymer derived in part from a first triorganotin compound exhibiting the formula $R_3SnOOCR'$
   wherein
      R is selected from the group consisting of alkyl, cycloalkyl, and aryl radicals, and
      R' is a polymerizable group selected from the group consisting of vinyl, $\alpha$-methylvinyl, and phenylvinyl radicals,
   wherein
      repeating units derived from said compound constitute from 25-80 mole % of the total repeating units present in said polymer, the remaining 20-75 mole % of said repeating units being derived from at least one ethylenically unsaturated compound that is copolymerizable with said first triorganotin compound,
   (b) 1 to 50% by weight of the total composition of at least one metalliferous pigment, and
   (c) 30 to 80% by weight of the total composition of an inert diluent,
   the improvement which consists of the presence in said composition of from
   0.01 to 10% by weight of the total composition of a biologically inactive film-forming polymer derived in part from a second triorganotin compound exhibiting the formula $R_3^2SnOOCR^3$,
   wherein
      $R^2$ is selected from the same group as R and
      $R^3$ is selected from the same group as R' and the repeating units derived from said triorganotin compound constitute from 1 to 15 mole % of the total repeating units present, the remaining 85-99 mole % of said repeating units being derived from at least one ethylenically unsaturated compound that is copolymerizable with said second triorganotin compound.

2. The process according to claim 1 wherein R and $R^2$ are independently selected from the group consisting of alkyl containing from 1 to 8 carbon atoms, cyclopentyl, cyclohexyl, and phenyl radicals.

3. The process of claim 2 wherein R and $R^2$ are butyl.

4. The process according to claim 1 wherein R' and $R^3$ are independently selected from the group consisting of vinyl, $\alpha$-methylvinyl, and phenylvinyl radicals.

5. The process of claim 4 wherein R' and $R^3$ are $\alpha$-methylvinyl.

6. In an improved coating composition for protecting marine surfaces against growth of fouling organisms said coating composition comprising:
   (a) 1 to 30% by weight of the total composition of a biologically active film-forming polymer derived in part from a first triorganotin compound exhibiting the formula $R_3SnOOCR'$
   wherein
      R is selected from the group consisting of alkyl, cycloalkyl, and aryl radicals, and
      R' is a polymerizable group selected from the group consisting of vinyl, $\alpha$-methylvinyl, and phenylvinyl radicals,
   wherein
      repeating units derived from said compound constitute from 25-80 mole % of the total repeating units present in said polymer, the remaining 20-75 mole % of said repeating units being derived from at least one ethylenically unsaturated compound that is copolymerizable with said first triorganotin compound,
   (b) 1 to 50% by weight of the total composition of at least one metalliferous pigment, and
   (c) 30 to 80% by weight of the total composition of an inert diluent,
   the improvement which consists of the presence in said composition of from
   0.01 to 10% by weight of the total composition of a biologically inactive film-forming polymer derived in part from a second triorganotin compound exhibiting the formula $R_3^2SnOOCR^3$,
   wherein
      $R^2$ is selected from the same group as R and
      $R^3$ is selected from the same group as R' and the repeating units derived from said triorganotin compound constitute from 1 to 15 mole % of the total repeating units present, the remaining 85-99 mole % of said repeating units being derived from at least one ethylenically unsaturated compound that is copolymerizable with said second triorganotin compound.

7. The composition according to claim 6 wherein R and $R^2$ are independently selected from the group consisting of alkyl containing 1 to 8 carbon atoms, cyclopentyl, cyclohexyl, and phenyl radicals.

8. The composition of claim 7 wherein R and $R^2$ are butyl.

9. The composition according to claim 6 wherein R' and $R^3$ are independently selected from the group consisting of vinyl, α-methylvinyl, and phenylvinyl radicals.

10. The composition of claim 9 wherein R' and $R^3$ are α-methylvinyl.

* * * * *